US011053378B2

(12) United States Patent
Howie et al.

(10) Patent No.: US 11,053,378 B2
(45) Date of Patent: Jul. 6, 2021

(54) POLYOLEFIN RESIN COMPOSITION

(71) Applicant: Asahi Kasei Plastics North America, Inc., Fowlerville, MI (US)

(72) Inventors: Timothy A. Howie, Byron, MI (US); Laura T. Shereda, Fowlerville, MI (US)

(73) Assignee: Asahi Kasei Plastics North America, Inc., Fowlerville, MI (US)

( * ) Notice: Subject to any disclaimer, the term of this patent is extended or adjusted under 35 U.S.C. 154(b) by 775 days.

(21) Appl. No.: 15/796,258

(22) Filed: Oct. 27, 2017

(65) Prior Publication Data

US 2018/0118930 A1 May 3, 2018

Related U.S. Application Data

(60) Provisional application No. 62/414,460, filed on Oct. 28, 2016.

(51) Int. Cl.
| | |
|---|---|
| *C08L 23/12* | (2006.01) |
| *C08L 23/06* | (2006.01) |
| *C08L 23/14* | (2006.01) |
| *C08L 77/02* | (2006.01) |

(52) U.S. Cl.
CPC .............. *C08L 23/12* (2013.01); *C08L 23/06* (2013.01); *C08L 23/14* (2013.01); *C08L 2205/025* (2013.01); *C08L 2205/03* (2013.01); *C08L 2205/035* (2013.01); *C08L 2310/00* (2013.01)

(58) Field of Classification Search
CPC .......... C08L 23/12; C08L 23/06; C08L 23/14; C08L 2205/025; C08L 2205/03; C08L 2205/035; C08L 2310/00; C08L 27/18; C08L 23/10; C08L 83/04; C08L 77/00; C08L 77/02; C08L 2205/08; C08K 7/28; C08K 3/346; C08K 3/013; C08K 7/00
USPC ........................................................... 524/97
See application file for complete search history.

(56) References Cited

U.S. PATENT DOCUMENTS

| | | | | |
|---|---|---|---|---|
| 5,185,188 A | * | 2/1993 | Abe ...................... | B29C 59/005 264/446 |
| 5,631,042 A | * | 5/1997 | Becker .................... | C09D 5/00 427/154 |

OTHER PUBLICATIONS

Liu et al., "Effects of Surface Modification of Talc on Mechanical Properties of Polypropylene/Talc Composites" (AIP Conference Proceedings 1713, 120008 (2016)—Published Online: Mar. 9, 2016). (Year: 2016).*
Wang et al., "Effect of Nucleating Agent on the Crystallization Behavior, Crystal Form and Solar Reflectance of Polypropylene", (Solar Energy Materials & Solar Cells, 117 (2013) 577-584). (Year: 2013).*

* cited by examiner

*Primary Examiner* — Ling Siu Choi
*Assistant Examiner* — Ronald Grinsted
(74) *Attorney, Agent, or Firm* — Howard & Howard Attorneys PLLC

(57) ABSTRACT

A polyolefin resin composition includes 15-65% by weight of a polypropylene homopolymer, 5-35% by weight of a polypropylene copolymer, 5-65% by weight of a reinforcing filler, 0.25-5% by weight of a polypropylene compatibilizer, and 1-25% by weight of a surface active agent.

34 Claims, No Drawings

POLYOLEFIN RESIN COMPOSITION

CROSS REFERENCE TO RELATED APPLICATIONS

This non-provisional application claims the benefit under 35 U.S.C. § 119(e) to U.S. Provisional Application No. 62/414,460, filed on Oct. 28, 2016, which is hereby expressly incorporated by reference into the present application.

BACKGROUND

1. Technical Field

The technical field relates to a polyolefin resin composition having a very high stiffness and toughness in combination with high water repellency and chemical resistance, low temperature ductility, and resistance to ice buildup. Articles made of the inventive composition are useful in many applications including household appliances, machinery or agricultural parts, snowmobiles and ATVs, snow blowers, and automotive exterior applications such as roof rails, wiper blades, grills, and air louvers.

2. Description of the Background Art

Many applications in plastics require high strength and stiffness as well as chemical and scratch resistance. However, when requirements of water repellency and excellent low temperature ductility are added, there are far fewer materials that are acceptable. Some of these demanding applications include agricultural parts, snowmobiles and ATVs, snow blowers, and automotive exterior applications such as roof rails, grills, air louvers, mirror shells, door handles, mud flaps, wheel liners, bin covers, and wiper blades. Many of these applications also demand resistance to harsh temperatures and outdoor weather such as water, ice, and snow; common agricultural chemicals such as pesticides and solvents; and commonly used automotive care products.

Polypropylene is an excellent choice for many of these applications due to its high strength to mass ratio, excellent surface quality, colorability, and lower cost. In order to achieve the demanding balance of properties required for these applications, other plastics may have to be painted or coated to address their inferior chemical and water resistance, which increases cost and manufacturing complexity.

It has surprisingly been found that injection molded articles of the inventive composition possess high strength and excellent low temperature ductility, as well as water repellency, chemical resistance, and superior resistance to scratch and mar. Even more surprisingly, it has been found that molded articles produced from the present invention prevent buildup of ice at cold temperatures.

SUMMARY

The composition disclosed below can be used for any of the applications discussed above.

In one embodiment, a polyolefin resin composition includes 10-75% by weight of a polypropylene homopolymer, 5-35% by weight of a polypropylene copolymer, 5-65% by weight of one or more reinforcing fillers, 0.25-5% by weight of a compatibilizer, and 1-25% by weight of a surface active agent.

In another embodiment, a polyolefin resin composition includes 15-65% by weight of a polypropylene homopolymer, 5-35% by weight of a polypropylene copolymer, 2-15% by weight of a polyamide resin, 5-65% by weight of a reinforcing filler, 0.25-5% of a polypropylene compatibilizer, and 1-25% by weight of a surface active agent.

The composition may optionally contain up to 10% by weight of other additives such as antiscratch additives, colorants, antistatic agents, heat stabilizers, UV stabilizers, processing aids, and nucleating agents. The resulting compositions have high stiffness and toughness, low temperature ductility, water repellency, and resistance to ice formation.

The amount of polypropylene homopolymer may be 15-65% or 25-50% by weight.

The polyamide resin may be selected from a group of polyamide resins such as polyamide 6, polyamide 6/6, polyamide 6/12, polyamide 11, or polyamide 12.

The reinforcing filler may be a fibrous filler selected from the group consisting of glass fiber, organic fiber (such as wood, vegetable, hemp, or other natural fibers), graphite fiber, and combinations thereof. The reinforcing filler may be a mineral filler such as mica, talc, wollastonite, or clay. The reinforcing filler may be a combination of at least one fibrous filler and at least one mineral filler.

The surface active agent may comprise a polydimethylsilicone or siloxane in pure or masterbatch form, PTFE, or an additive that migrates to the surface upon molding. The amount of the surface active agent may be 1-25% by weight.

The composition may further include 0.25-1.0% by weight of an alpha nucleating agent.

The composition may have a melt flow rate of 0.5-25 g/10 min, which is suitable for melt forming processes such as injection molding, thermoforming, blow molding, or compression molding.

In another embodiment, a molded article comprises the composition described above. The molded article may have a contact angle of at least 90 degrees, a tensile strength of 45 MPa or greater, and/or a notched charpy impact of 7 $kJ/m^2$ or greater at 23° C. and 5 $kJ/m^2$ or greater at −30° C.

Further scope of applicability of the disclosed embodiments will become apparent from the detailed description given hereinafter. However, it should be understood that the detailed description and specific examples, while indicating alternative embodiments of the disclosed embodiments, are given by way of illustration only, since various changes and modifications within the spirit and scope of the disclosed embodiments will become apparent to one of ordinary skill in the art from this detailed description.

DETAILED DESCRIPTION OF THE DISCLOSED EMBODIMENTS

In the following detailed description, for purposes of explanation, numerous specific details are set forth in order to provide a thorough understanding of the disclosed embodiments. It will be apparent, however, that one or more embodiments may be practiced without these specific details. The inventive concept may be embodied in various forms without being limited to the exemplary embodiments set forth herein.

The inventive compositions have high stiffness and toughness, low temperature ductility, water repellency, and resistance to ice formation.

In one embodiment, a polyolefin resin composition includes 15-65% by weight of a polypropylene homopolymer, 5-35% by weight of a polypropylene copolymer, 5-65% by weight of a reinforcing filler, 0.25-5% of a polypropylene compatibilizer, and 1-25% by weight of a surface active agent.

In another embodiment, a polypropylene composition includes 10-75% by weight of one or more polypropylene homopolymers, 5-35% by weight of one or more polypropylene copolymer, 2-15% by weight of a polyamide resin, 5-65% by weight of one or more reinforcing fillers, 0.25-5% by weight of a compatibilizer, and 1-25% by weight of a surface active agent. That is, this embodiment further includes a polyamide resin.

<Polypropylene Homopolymer>

The polypropylene homopolymer is at least one polypropylene homopolymer that contributes significantly to the stiffness and toughness of the compound. The propylene homopolymer may be nucleated or non-nucleated.

The polypropylene homopolymer may include one or more polypropylene homopolymers. The polypropylene homopolymer may have a MFR, measured according to ISO 1133-1 (2011) at 230° C. and under a load of 2.16 kg, of at least 2 g/10 min, preferably at least 10 g/10 min, more preferably of at least 25 g/10 min, and a maximum of about 150 g/10 min. The amount soluble in cold xylene of the polypropylene homopolymer may be not more than 5 wt. %, more preferably not more than 3 wt. %, and most preferably not more than 2 wt. % based on the total amount of the polypropylene homopolymer.

The polypropylene homopolymer may have an isopentad concentration of more than 95%, more preferably of more than 97%, and most preferably of more than 98%.

Examples of suitable polypropylene homopolymers include Formolene 4100T, Formolene 1102KR, and other Formolene homopolymer grades from *Formosa*; Pro fax H350, available from Lyondell Basell; and H35G-00 or H03W-01 from Ineos.

The amount of the polypropylene homopolymer may be 15-65% or 25-50% by weight. The amount of the polypropylene homopolymer is preferably at least 20 wt % and more preferably is at least 30 wt % of the polypropylene composition.

<Polypropylene Copolymer>

The function of the polypropylene copolymer is to increase impact resistance of the composition—especially to improve ductility at sub ambient temperatures. The polypropylene copolymer may be a propylene copolymer with a comonomer content of not more than 30 wt %, more preferably with a comonomer content of not more than 25 wt %, and most preferably a propylene copolymer with a comonomer content of not more than 20 wt %. The comonomers used for the production of the polypropylene copolymer may be selected from any compolymerizable alpha-olefins. However, ethylene and/or C2,C4-C20-alpha-olefins are preferred, even more preferred are ethylene and/or C2,C4-C16-alpha-olefins, even more preferred are ethylene and/or C2,C4-C10-alpha-olefins, e.g. ethylene, 1-butene, 1-hexene, 1-octene. Most preferably, the alpha-olefin is ethylene.

The polypropylene copolymer may have a MFR, measured according to ISO 1133 at 230° C. and under a load of 2.16 kg, of at least 0.5 g/10 min, preferably at least 10 g/10 min, more preferably of at least 25 g/10 min, and a maximum of about 110 g/10 min.

Suitable examples of the polypropylene copolymer include TI4350P and TI4015F available from Braskem, Profax SB891 and Profax SG802 available from Lyondell Basell, and other similar resins.

The amount of the polypropylene copolymer may be 5-35% by weight, preferably 10-30% by weight, most preferably 10-25% by weight.

<Polyamide Resin>

The polyamide resin both increases the strength of the composition and the compatibility of the compound. The polyamide resin may be selected from a group of polyamide resins including polyamide 4/6, polyamide 6, polyamide 6/6, polyamide 6/10, and polyamide 6/12. Preferably, the polyamide resin is polyamide 6, polyamide 11, or polyamide 12.

The polyamide resin may have an RV range of 35-55, measured in formic acid according to ASTM D789-15 (2015). Suitable examples of the polyamide resin include Stanyl TE300 available from DSM, 151L NC010 available from Dupont, Rilsan BECN TL, Rilsan AMN D from ARKEMA, or Ultramid 8202C from BASF.

The amount of the polyamide resin may be 2-15% by weight, preferably 4-12% by weight.

<Reinforcing Filler>

The reinforcing filler contributes to the strength and stiffness of the composition. The reinforcing filler may be selected from the group of organic or inorganic reinforcing fillers having a highly anisotropic particulate structure, being anisotropic in a one-dimensional (fiber-like) or two-dimensional (platelet-like) fashion. Choices of fiber-like components include both inorganic or organic fibers, preferably glass fiber or graphite fiber. However, fibers as diverse as wollastonite, PET, polyamide or Kevlar can be used. Fibers may be present in the form of long (6 mm to 25 mm) or short (1 mm-6 mm) fibers, continuous fibers, ground or milled materials, beads, or hollow glass beads, bubbles or mixtures thereof. Preferably, the reinforcing filler is glass fiber, present in the composition as 5-65% by weight of the total composition. More preferably, glass fiber is present between 15-50% of the total weight of the composition. Preferably, the fiber is short glass fiber (1-6 mm) or long glass fiber (7 mm-25 mm).

The reinforcing filler may also be selected from a group of minerals such as mica, clay, siliceous materials, ceramics, glass, sulfate minerals, or mixtures thereof. Some common examples of mineral fillers include mica, talc, kaolin, bentonite, wollastonite, clay and other platy materials. The filler may also be organic and may be fibrous or platy in nature.

The reinforcing filler may be a fibrous filler selected from the group consisting of glass fiber, organic fiber, graphite fiber, and combinations thereof. Glass fiber may have a diameter of 10 microns to 17 microns. Fibers may range in length from continuous fibers to chopped strands of length 1 mm-10 mm. The reinforcing filler may be a mineral filler. The reinforcing filler may be a combination of at least one fibrous filler and at least one mineral filler.

The amount of the reinforcing filler may be 5-65% by weight, preferably 10-60%, most preferably 20-60% by weight.

<Polypropylene Compatibilizer>

To improve adhesion to glass fibers, polar functionalized compatibilizers or coupling agents may be used to make the inorganic filler materials more organophilic and, therefore, more compatible with the polypropylene matrix. The polypropylene compatibilizer may be selected from a group of compatibilizers or coupling agents and comprises between 0.10 and 6% by weight of the total weight of the composition, preferably 0.25-5% by weight. Such materials may be grafted on a polyolefin. Polypropylene homopolymers or alpha olefin copolymers of propylene or ethylene may serve as carriers. Maleic anhydride grafted polyolefins are available commercially, including Polybond 3200 by Addivant and G3003 by Eastman. Other coupling agents can be produced from various organic acids and anhydrides such as carboxylic acids, maleic acid, maleic anhydride, fumaric acid, citraconic acid, itaconic acid, acrylic acid, methacrylic acid, and the anhydrides or esters derived therefrom. Epoxies or silanes may also be used. Maleic anhydride grafted polypropylene is the preferred coupling agent. The functional grafted maleic anhydride content in the coupling agent is preferably 0.1-2% by weight based on the total weight of the compatibilizer. The disadvantage of the coupling agent is that it increases wettability of the polymer.

The amount of coupling agent used in the polymeric blend may vary according to the nature of the coupling agent used, but in filled or reinforced polyolefin compositions, the functional organic acid graft is generally present from 0.01-4% by weight of the blend. Suitable coupling agents are Bondyram 1001 by Polyram and Polybond 3200 produced by Addivant.

<Surface Active Agent>

The surface active agent is used to decrease the surface energy of the composition, increasing the water repellability, and decreasing surface whetting. The disadvantage of the surface active agent is that decreases the strength of the composition. The composition comprises 1-25% by weight of a surface active agent, preferably 5-20% by weight. Some acceptable surface active agents include silicone or siloxane masterbatches, PTFE, antistatic agents, and other ingredients that migrate to the surface of the polypropylene article when injection molded. Suitable examples of the surface active agent may include a siloxane masterbatch such as those in the MB-50 series (SiMB1) from Multibase or may include materials from the Xiameter 200 Fluid Series by Dow Corning.

<Additives>

The inventive composition may also include up to 10% of additional processing aids and other additives, including but not limited to miscible thermoplastics, flow enhancers, clarifiers, antioxidants, UV-stabilizers, heat stabilizers, lubricants, demolding agents, nucleating agents, coloring agents, and foaming agents, which can be added to the composition before, during, or after the blending in an amount of up to 10 wt %, preferably up to 7 wt % based on the total weight of the polypropylene composition.

<Other Components>

The composition disclosed herein may also include 0-30% by weight elastomer or plastomer. Suitable elastomers include α-olefin copolymers and elastomers and styrene based elastomers, such as those marketed under the trade names Engage, Tafmer, Tuftec, Versify, or Vistomaxx.

The following materials are not needed and are preferably omitted from the composition: random polypropylene, atactic polypropylene, syndiotactic polypropylene, branched polypropylene, cyclic olefins, beta nucleating agents, crosslinked polypropylene, crosslinked compounds, vulcanization or vulcanized rubber or crosslinked rubber, styrene, acrylonitrile butadiene styrene (ABS), flame retardant materials, ethylene propylene diene monomer (EPDM), ethylene propylene diene rubber (EPDR), alkyl acrylates, and aliphatic carboxylic acid salts.

<Process of Preparing the Polyolefin Resin Composition>

The polyolefin resin composition according to the invention may be prepared by melt mixing together the solid components by any suitable method known in the art, preferably using a twin screw extruder with downstream feeding capabilities. In other preferred embodiments, it is possible that all or part of the reinforcing filler can be added downstream via a side feeder.

If the surface active agent is in powder or pellet form, it may be added either in the feed throat or a side feeder. If the surface active agent is in liquid form, it may be pumped into the extruder using an injection pump. Preferably, the barrel temperatures are set at a temperature between 170° C. and 270° C., more preferably between 175° C. and 240° C. The screw configuration is a general polypropylene screw optimized for glass fiber with one or more high intensity mixing segments, which is well known to one of ordinary skill in the art. Screw speed should be within the range of 200 and 750 rpm. The compounded material can then be stranded and pelletized or underwater pelletized.

<Molded Article>

The invention is furthermore directed to a molded or extruded article made of the polyolefin resin compositions according to all embodiments of the present invention, especially molded articles and in particular injection molded articles. The molded article may have a contact angle with a water droplet to the molded surface of at least 90 degrees, a tensile strength of 45 MPa or greater, preferably 60 MPa or greater, most preferably 80 MPa or greater. The molded article may have a notched charpy impact of 7 kJ/m$^2$ or greater at 23° C., preferably 10 kJ/m$^2$ or greater, and 5 kJ/m$^2$ or greater at −30° C., more preferably 10 kJ/m$^2$ or greater at −30° C.

<Properties of the Polyolefin Resin Composition>

The polyolefin resin composition preferably has an MFR, determined according to ISO 1133 at 230° C. and under a load of 2.16 kg, of not more than 25 g/10 min, more preferably of not more than 15 g/10 min, and most preferably of not more than 10 g/10 min.

The polyolefin resin composition preferably has a tensile strength of at least 45 MPa, determined according to ISO 527-2, of at least 60 MPa and most preferably of at least 90 MPa measured on a test specimen prepared by injection molding according to ISO 1873-2 (2007).

The polyolefin resin composition may have a flexural modulus measured according to ISO 178 (2010), using injection molded test specimens, of at least 3000 MPa, more preferably at least 5000 MPa, and most preferably at least 7000 MPa.

The polyolefin resin composition preferably has an impact strength in a charpy notch test according to ISO 179/1eA: 2000 at +23° C. of at least 5.0 kJ/m$^2$, more preferably of at least 10.0 kJ/m$^2$ and most preferably of at least 12.0 kJ/m$^2$ measured on a V-notched test specimen prepared by injection molding according to ISO 1873-2 (2007). Preferably, the polypropylene composition has a notched charpy impact strength at −30° C. of 5.0 MPa, and more preferably of at least 10 MPa.

The polyolefin resin composition preferably has a heat deflection temperature (HDT) determined according to ISO 75-2/A at 1.8 MPa of at least 95° C. measured on a test specimen prepared by injection molding according to ISO 1873-2 (2007), more preferably a HDT of at least 110° C., and most preferably a HDT of at least 130° C.

The polyolefin resin composition may have a contact angle of at least 90 degrees according to ASTM D5946-09 (2009), preferably a contact angle of at least 100 degrees The disclosed embodiment will hereinafter be described with reference to exemplary embodiments, which are written to be understood only as examples and are not intended to limit the scope of the present application.

EXAMPLES

Both the inventive examples and comparative examples below were produced on a Coperion 40 mm twin screw extruder with downstream feeding capabilities, with barrel temperatures between 190° C. and 235° C. at screw speeds between 300 and 650 rpm, at a line rate of 75-3000 lb/hour. Out of the die, the compounded material is stranded and fed into a pelletizer wherein the pellets may have a length of 3-10 mm.

The obtained compositions were then evaluated for melt flow rate, density, tensile strength, tensile modulus chord, flexural strength, flexural modulus chord, charpy notched impact strength at 23° C. and −30° C., HDT, and contract angle based on the standards, which are discussed above.

The following materials are used in the examples:

HPP1: Formolene 4100T polypropylene homopolymer from *Formosa*

HPP2: Formolene 1102KR polypropylene homopolymer from *Formosa*

COPP1: TI4350P polypropylene copolymer from Braskem

PA1: AEGIS Nylon 6 polyamide resin colorant: SCC 22598 colorant from Standridge

MAH-PP1: Bondyram 1001 coupling agent from Polyram

StabUV1: 21 wt % Irganox 1010, 11 wt % Irgafos 168, 21 wt % Cyasorb UV-3346, and 47 wt % Cyasorb UV-3853

SiMB1: MB-50-001 surface active agent from Multibase

SiMB2: PMX-200 surface active agent from Dow Corning

PTFE1: Polymist from Solvay

ASTAT1: Atmer 129 from Croda

StabUV2: Lowite 77 from Addivant

FG1: HP 3270 3.2 MM fiber glass from PPG (10-13 micron diameter)

HTSTAB1: a combination of 20 wt % Irganox 1010, 13.3 wt % Irgafos 168, 53.3 wt % distearyl thiodipropionate (DSTDP), and 13.3 wt % calcium stearate COPP2: TI4015F polypropylene copolymer from Braskem

Example 1

Ingredients HPP1, COPP1, PA1, Colorant, MAH-PP1, StabUV1, and PTFE1 were combined in the feed throat in the amounts shown in Table 1 below. Ten micron diameter fiberglass (FG1) was side fed downstream in the amount shown in Table 1 below. The resulting material had a melt flow rate in g/10 min (230° C./2.16 kg) of 2.89 and a density of 1.29. These and other properties of Example 1 are shown in Table 3 below.

Example 2

Ingredients HPP1, COPP1, PA1, Colorant, MAH-PP1, StabUV1, and ASTAT1 were combined in the feed throat in the amounts shown in Table 1 below. FG1 was side fed downstream in the amount shown in Table 1 below.

The properties of Example 2 are shown in Table 3 below.

Examples 3-4

HPP1, HPP2, COPP1, PA1, Colorant, MAH-PP1, StabUV1, and SiMB1 were combined in the feed throat in the amounts shown in Table 1 below. FG1 was side fed downstream in the amount shown in Table 1 below.

The properties of Examples 3-4 are shown in Table 3 below.

Examples 5-6

HPP1, COPP1, Colorant, MAH-PP1, and StabUV1 were combined in the feed throat in the amounts shown in Table 1 below. SiMB2 was added to the mixture downstream using an injection pump in the amount shown in Table 1 below. FG1 was side fed downstream in the amount shown in Table 1 below.

The properties of Examples 5-6 are shown in Table 3 below.

Example 7

HPP1, COPP1, Colorant, MAH-PP1, and StabUV1 were combined in the feed throat in the amounts shown in Table 1 below. SiMB1 was also fed into the feed throat in the amount shown in Table 1 below. FG1 was side fed downstream in the amount shown in Table 1 below.

The properties of Example 7 are shown in Table 3 below.

Comparative Example 1

HPP1, COPP1, PA1, Colorant, MAH-PP1, and StabUV1 were combined in the feed throat in the amounts shown in Table 2 below. FG1 was side fed downstream in the amount shown in Table 2 below.

The properties of Comparative Example 1 are shown in Table 4 below.

Comparative Example 2

HPP1, HPP2, COPP2, PA1, Colorant, MAH-PP1, and StabUV1 were combined in the feed throat in the amounts shown in Table 2 below. FG1 was side fed downstream in the amount shown in Table 2 below.

The properties of Comparative Example 2 are shown in Table 4 below.

Comparative Example 3

HPP1, HPP2, MAH-PP1, HTSTAB1, and PTFE1 were combined in the feed throat in the amounts shown in Table 2 below. FG1 was side fed downstream in the amount shown in Table 2 below.

The properties of Comparative Example 3 are shown in Table 4 below.

Comparative Example 4

HPP1, HPP2, Colorant, and HTSTAB1 were combined in the feed throat in the amounts shown in Table 2 below. FG1 was side fed downstream in the amount shown in Table 2 below.

The properties of Comparative Example 4 are shown in Table 4 below.

Comparative Example 5

HPP1, COPP1, PA1, Colorant, MAH-PP1, StabUV1, and StabUV2 were combined in the feed throat in the amounts shown in Table 1 below. FG1 was side fed downstream in the amount shown in Table 2 below.

The properties of Comparative Example 5 are shown in Table 4 below.

TABLE 1

| | Inventive Examples | | | | | | |
|---|---|---|---|---|---|---|---|
| | 1 % | 2 % | 3 % | 4 % | 5 % | 6 % | 7 % |
| HPP1 | 33.85 | 35.85 | 22.24 | 41.24 | 38.85 | 34.84 | 26.84 |
| HPP2 | | | 10.01 | 10.01 | | | |
| COPP1 | 12 | 12 | 25 | 6 | 12 | 12 | 12 |
| PA1 | 5 | 5 | 10 | 10 | | | |
| Colorant | 2 | 2 | 2 | 2 | 2 | 2 | 2 |
| MAH-PP1 | 2 | 2 | 2 | 2 | 2 | 2 | 2 |
| StabUV1 | 1.15 | 1.15 | 0.75 | 0.75 | 1.15 | 1.15 | 1.15 |
| SiMB1 | | | 8 | 8 | | | 16 |
| SiMB2 | | | | | 4 | 8 | |
| PTFE1 | 4 | | | | | | |
| ASTAT1 | | 2 | | | | | |
| StabUV2 | | | | | | | |
| FG1 | 40 | 40 | 20 | 20 | 40 | 40 | 40 |

TABLE 2

| | Comparative Examples | | | | |
|---|---|---|---|---|---|
| | 1 % | 2 % | 3 % | 4 % | 5 % |
| HPP1 | 37.85 | 36.85 | 24.5 | 9.4 | 36.35 |
| HPP2 | | 5 | 34.1 | 48 | |
| COPP1 | 12 | | | | 12 |
| COPP2 | | | 10 | | |
| PA1 | 5 | 5 | | | 5 |
| Colorant | 2 | 2 | | 2 | 2 |
| MAH-PP1 | 2 | 2 | 1 | | 2 |
| StabUV1 | 1.15 | 1.15 | | | 1.15 |
| StabUV2 | | | | | 1.5 |
| HTSTAB1 | | | 0.4 | 0.6 | |
| PTFE1 | | | 10 | | |
| FG1 | 40 | 38 | 10 | 40 | 40 |

TABLE 3

| Test Name | Test Number | Test Conditions | Units | Inventive Examples | | | | | | |
|---|---|---|---|---|---|---|---|---|---|---|
| | | | | 1 | 2 | 3 | 4 | 5 | 6 | 7 |
| MFR | ISO 1133 | 230° C./2.16 kg | g/10 min | 2.89 | 3.93 | 2.5 | 5.4 | 5.7 | 5.8 | 3.3 |
| Density | ASTM D6980 | — | g/cm$^3$ | 1.29 | 1.26 | 1.064 | 1.062 | 1.232 | 1.221 | 1.235 |
| Tensile Strength | ISO 527 | 5 mm/min-Ext. | MPa | 99.7 | 104 | 63.1 | 69 | 95.8 | 91.7 | 73 |
| Tensile Modulus Chord | ISO 527 | 1 mm/min-Ext. | MPa | 9330 | 8930 | | | | | |
| Flex Strength | ISO 178 | 2 mm/min | MPa | 159 | 161 | 101 | 107 | 154 | 148 | 112 |
| Flex Modulus Chord | ISO 178 | 2 mm/min | MPa | 8340 | 8300 | 4010 | 4070 | 7560 | 7280 | 6920 |
| Charpy Notched | ISO 179 | 23° C. | kJ/m$^2$ | 12 | 12 | 10 | 9.1 | 12 | 13 | 13 |
| Charpy Notched | ISO 179 | −30° C. | kJ/m$^2$ | 10 | 11 | 6.4 | 6.2 | 11.7 | 13 | 12.2 |
| HDT | ISO 75 | 1.8 Mpa | ° C. | 148 | 147 | 136 | 140 | 150 | 150 | 145 |
| Contact Angle | ASTM D5946-09 | 23° C. | ° | ≥90 | ≥90 | ≥90 | ≥90 | ≥90 | ≥90 | ≥90 |

TABLE 4

| Test Name | Test Number | Test Conditions | Units | Comparative Examples | | | | |
|---|---|---|---|---|---|---|---|---|
| | | | | 1 | 2 | 3 | 4 | 5 |
| Melt Flow Rate | ISO 1133 | 230° C./2.16 kg | g/10 min | 3.26 | 4.2 | 4.6 | 4 | 4.42 |
| Density | ASTM D6980 | — | g/cm$^3$ | 1.25 | 1.229 | 1.028 | 1.24 | 1.24 |
| Tensile Strength | ISO 527 | 5 mm/min-Ext. | MPa | 101 | 89.9 | 55.8 | 88 | 95.6 |
| Tensile Modulus Chord | ISO 527 | 1 mm/min-Ext. | MPa | 8870 | | | | 8390 |
| Flex Strength | ISO 178 | 2 mm/min | MPa | 159 | 142 | 82 | 134 | 149 |
| Flex Modulus Chord | ISO 178 | 2 mm/min | MPa | 8060 | 6980 | 2801 | 7600 | 7630 |
| Charpy Notched | ISO 179 | 23° C. | kJ/m$^2$ | 12 | 15.4 | 5.8 | 10 | 12.5 |

TABLE 4-continued

| Test Name | Test Number | Test Conditions | Units | Comparative Examples | | | | |
|---|---|---|---|---|---|---|---|---|
| | | | | 1 | 2 | 3 | 4 | 5 |
| Charpy Notched | ISO 179 | −30° C. | kJ/m$^2$ | 9.6 | | | 7.6 | 10 |
| HDT | ISO 75 | 1.8 Mpa | ° C. | 147 | 146 | 139 | 136 | 146 |
| Contact Angle | ASTM D5946-09 | 23° C. | ° | <90 | <90 | ≥90 | | ≥90 |

Articles of the examples described above may be molded using any suitable method known in the art, preferably by injection molding. In the case of injection molding, the mold temperature may be set between 25° C.-65° C. and the barrel temperatures between 195° C.-260° C. Other parameters such as RPMs and back pressure are well known to those experienced in the art.

Comparative Examples 1 and 2 do not have a surface active agent. The molded articles made from these compositions do not exhibit the necessary water repellency. Comparative Example 3 does not contain polypropylene copolymer or a polyamide resin and has an insufficient flexural modulus. Comparative Example 4 lacks the necessary impact resistance, especially at low temperatures.

It will be apparent to those skilled in the art that various modifications and variations can be made to the disclosed embodiments. It is intended that the specification and examples be considered as exemplary only with a true scope of the disclosure being indicated by the following claims and their equivalents.

The invention claimed is:

1. A polyolefin resin composition, comprising:
   15-65% by weight of one of more polypropylene homopolymers based on a total weight of said composition,
   5-35% by weight of one or more polypropylene copolymers based on the total weight of said composition,
   5-65% by weight of a reinforcing filler based on the total weight of said composition,
   0.25-5% by weight of a polypropylene compatibilizer based on the total weight of said composition, and
   1-25% by weight of a surface active agent based on the total weight of said composition.

2. The composition of claim 1, further comprising up to 10% by weight additives based on the total weight of said composition.

3. The composition of claim 1, wherein the reinforcing filler is fibrous filler selected from the group consisting of glass fiber, organic fiber, graphite fiber, basalt fiber, synthetic fiber, other inorganic fibers, and combinations thereof.

4. The composition of claim 1, wherein the reinforcing filler is a mineral filler.

5. The composition of claim 4, wherein the mineral filler is at least one of talc, calcium carbonate, wollastonite, or clay.

6. The composition of claim 1, wherein the reinforcing filler is a combination of at least one fibrous filler and at least one mineral filler.

7. The composition of claim 1, wherein the surface active agent comprises a silicone or silicone masterbatch.

8. The composition of claim 1, wherein the surface active agent comprises a siloxane or siloxane masterbatch.

9. The composition of claim 1, wherein the surface active agent comprises PTFE or another fluoropolymer.

10. The composition of claim 1, further comprising 0.25-1.0% by weight of an alpha nucleating agent based on the total weight of said composition.

11. The composition of claim 1, wherein the polypropylene homopolymer is 25-50% by weight based on the total weight of said composition.

12. The composition of claim 1, having a melt flow rate of 2-25 g/10 min.

13. The composition of claim 1, having a flexural modulus of at least 3000 MPa.

14. A polyolefin resin composition, comprising:
   15-65% by weight of one or more polypropylene homopolymers based on a total weight of said composition,
   5-35% by weight of one or more polypropylene copolymers based on the total weight of said composition,
   2-15% by weight of a polyamide resin based on the total weight of said composition,
   5-65% by weight of a reinforcing filler based on the total weight of said composition,
   0.25-5% by weight of a polypropylene compatibilizer based on the total weight of said composition, and
   1-25% by weight of a surface active agent based on the total weight of said composition.

15. The composition of claim 14, further comprising up to 10% by weight additives.

16. The composition of claim 14, wherein the reinforcing filler is fibrous filler selected from the group consisting of glass fiber, organic fiber, graphite fiber, and combinations thereof.

17. The composition of claim 14, wherein the reinforcing filler is a mineral filler.

18. The composition of claim 14, wherein the reinforcing filler is a combination of at least one fibrous filler and at least one mineral filler.

19. The composition of claim 14, wherein the surface active agent comprises a silicone or silicone masterbatch.

20. The composition of claim 14, wherein the surface active agent comprises a siloxane or siloxane masterbatch.

21. The composition of claim 14, wherein the surface active agent comprises PTFE.

22. The composition of claim 14, further comprising 0.25-1.0% by weight of an alpha nucleating agent based on the total weight of said composition.

23. The composition of claim 14, wherein the polypropylene homopolymer is 25-50% by weight based on the total weight of said composition.

24. The composition of claim 14, having a melt flow rate of 2-25 g/10 min.

25. The composition of claim 14, having a flexural modulus of at least 3000 MPa.

26. A molded article, comprising the composition of claim 1 and having a contact angle of at least 90 degrees.

27. A molded article, comprising the composition of claim 1 and having a tensile strength of 45 MPa or greater.

28. A molded article, comprising the composition of claim 1 and having a notched charpy impact of 7 kJ/m² or greater at 23° C. and 5 kJ/m² or greater at −30° C.

29. A molded article, comprising the composition of claim 14 and having a contact angle of at least 90 degrees.

30. A molded article, comprising the composition of claim 14 and having a tensile strength of 45 MPa or greater.

31. A molded article, comprising the composition of claim 14 and having a notched charpy impact of 7 kJ/m² or greater at 23° C. and 5 kJ/m² or greater at −30° C.

32. The composition of claim 1, further comprising a polyamide resin.

33. The composition of claim 32, wherein the polyamide resin is a polyamide 6 resin, a polyamide 6/6 resin, or a polyamide 12 resin.

34. The composition of claim 1, wherein an amount of the surface active agent is 5-20% by weight based on the total weight of said composition.

* * * * *